United States Patent
Weber et al.

(10) Patent No.: US 11,880,870 B2
(45) Date of Patent: Jan. 23, 2024

(54) HEADLESS CONTENT MANAGEMENT SYSTEM (CMS)

(71) Applicant: SITECORE CORPORATION A/S, Copenhagen V (DK)

(72) Inventors: Adam K Weber, Prior Lake, MN (US); Nicholas J. Wesselman, Asheville, NC (US); Olexandr Shyba, San Francisco, CA (US); Michael Seifert, Charlottenlund (DK)

(73) Assignee: SITECORE CORPORATION A/S, Copenhagen V (DK)

( * ) Notice: Subject to any disclaimer, the term of this patent is extended or adjusted under 35 U.S.C. 154(b) by 753 days.

(21) Appl. No.: 15/894,335

(22) Filed: Feb. 12, 2018

(65) Prior Publication Data

US 2018/0232782 A1    Aug. 16, 2018

Related U.S. Application Data

(60) Provisional application No. 62/457,295, filed on Feb. 10, 2017.

(51) Int. Cl.
*G06Q 30/02* (2023.01)
*G06Q 30/0241* (2023.01)
(Continued)

(52) U.S. Cl.
CPC ....... *G06Q 30/0276* (2013.01); *G06F 3/0483* (2013.01); *G06F 16/955* (2019.01);
(Continued)

(58) Field of Classification Search
CPC ..... G06Q 30/0276; G06F 40/00; G06F 40/14; G06F 40/106; G06F 40/131;
(Continued)

(56) References Cited

U.S. PATENT DOCUMENTS 9,244,917 B1 *   1/2016   Sharma ................... G06F 16/93
2013/0198714 A1   8/2013   Moody et al.
(Continued)

FOREIGN PATENT DOCUMENTS

WO    03/044690    5/2003

OTHER PUBLICATIONS

Design and Implementation of j2EE-based Web Website ContentManagement System, Li Zhao pp. 3-5, IEEE (Year: 2010).*

*Primary Examiner* — Ilana L Spar
*Assistant Examiner* — Darnell A Pouncil
(74) *Attorney, Agent, or Firm* — Gates & Cooper LLP

(57) ABSTRACT

A system, method, and apparatus provide the ability to generate and deliver digital content in a headless content management system. A layout engine exposes a visual editing interface to a business user and accepts input to compose a layout consisting of components that define structural entities that control what to render. Marketing content is associated with the components. Each component is added, via the visual editing interface, to zones of the layout. Developer code may restrict a type of component that can be added to each zone. The layout and zones control a conceptual design for rendering the digital content. The layout engine receives a request for content from one of multiple different client applications that are executing in different hosting environments. The content is delivered, based on the layout, to the client application for rendering to a consumer.

24 Claims, 5 Drawing Sheets

(51) Int. Cl.
*G06F 3/0483* (2013.01)
*G06F 16/955* (2019.01)
*G06F 16/958* (2019.01)
*G06F 16/957* (2019.01)
*G06F 40/00* (2020.01)
*G06F 40/106* (2020.01)
*G06F 40/131* (2020.01)
*G06F 40/143* (2020.01)

(52) U.S. Cl.
CPC ........ *G06F 16/958* (2019.01); *G06F 16/9577* (2019.01); *G06F 40/00* (2020.01); *G06F 40/106* (2020.01); *G06F 40/131* (2020.01); *G06F 40/143* (2020.01)

(58) Field of Classification Search
CPC .. G06F 16/955; G06F 16/958; G06F 16/9577; G06F 3/0483; G06F 40/143
See application file for complete search history.

(56) References Cited

U.S. PATENT DOCUMENTS

| | | |
|---|---|---|
| 2014/0040222 A1 | 2/2014 | Schmitz et al. |
| 2014/0075275 A1* | 3/2014 | Aleksandrovsky ... G06F 40/166 715/202 |
| 2015/0106078 A1 | 4/2015 | Chang |
| 2015/0106156 A1 | 4/2015 | Chang et al. |
| 2015/0106157 A1 | 4/2015 | Chang et al. |
| 2015/0142567 A1 | 5/2015 | Neelakant |
| 2015/0185994 A1 | 7/2015 | Antipa |
| 2015/0220492 A1* | 8/2015 | Simeonov ............. G06F 16/972 715/244 |
| 2015/0264105 A1 | 9/2015 | V. et al. |
| 2015/0278179 A1 | 10/2015 | Aggarwal et al. |
| 2016/0048307 A1* | 2/2016 | Troyer .................... G06F 9/454 715/801 |
| 2016/0124813 A1 | 5/2016 | Jain |

\* cited by examiner

HEADLESS CONTENT MANAGEMENT SYSTEM (CMS)

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 62/457,295, filed on Feb. 10, 2017, with inventor(s) Michael Seifert, Alex Shyba, and Adam Weber, entitled "A Method for Generating a Website Using a Layout Engine and a Web Application."

This application is related to the following co-pending and commonly-assigned patent application, which application is incorporated by reference herein:

U.S. Pat. No. 7,856,345, filed on Nov. 21, 2002 as Ser. No. 10/300,830, and issued on Dec. 21, 2010, with inventors Jakob H. Christensen and Ole S. Thrane, entitled "Method for Building and Managing a Web Site," which application claims priority to U.S. Provisional Patent Application No. 60/331,766 filed on Nov. 21, 2001.

BACKGROUND OF THE INVENTION

1. Field of the Invention

The present invention relates generally to content management systems (CMS), and in particular, to a method, system, apparatus, and article of manufacture for a headless CMS that enables the presentation of content on any visual presentation device.

2. Description of the Related Art

A content management system (CMS) is an application that is often used for the creation and modification of digital content. Web CMS (WCM or WCMS) is a CMS designed to support the management of web pages. Traditional CMSs provide for the creation and modification of the digital content within a content database while also explicitly defining the layout and presentation of such digital content. Accordingly, traditional CMSs are monolithic with the presentation of the data incorporated into the system. Due to the lack of flexibility, some CMS have become decoupled (also referred to as "headless") such that content in a content repository/database is accessible via an API (Application Programming Interface) for display on a variety of devices. The decoupling/headless aspect refers to the concept of chopping the "head" (i.e., the front end/presentation side such as the website) off the "body" (i.e., the back end such as the content repository). While a traditional CMS combines the content and presentation layers together, a headless CMS provides the content component and focuses on the administrative interface for content creators, the facilitation of content workflows and collaboration, and the organization of content into categories.

The problem with prior art headless CMS systems is that such systems typically do not enable the full separation of the content from the presentation of the content resulting in poor omni-channel presentation capabilities. In other words, prior art headless CMSs lack the ability to generate digital content that can be presented on client applications on multiple different client devices. Further, since the presentation/layout capabilities are not part of a headless CMS, business users lose contextual editorial control for example with respect to presentation and have no personalization or optimization capabilities. Accordingly, what is needed is the ability to enable a CMS where a business user retains contextual editorial control over content and the presentation of such content.

SUMMARY OF THE INVENTION

To overcome the problems of the prior art, embodiments of the invention provide a headless content management system (CMS) where business users retain management including contextual editorial control and personalization over digital content including semantic/structural aspects while the final visual presentation of the digital content may remain under a developer's purview. In particular, a visual editing interface is exposed to a business user/operator (via a layout engine). The visual editing interface provides the business user with the ability to compose a layout from a set of components and variances that enable personalization of the rendering/visual representation of the digital content. The business user adds components/variances to zones on the layout, wherein the types of components that may be added to each zone may be restricted by a developer (e.g., thereby allowing a developer to retain stylistic control over the final visual representation of the digital content). In this regard, the business user has the ability to focus on the semantics and content rather than the look and feel.

Upon request by a client application for content (e.g., based on a request for a layout), the content in each of the components is dynamically assembled to thereby provide personalized content that is delivered. Further, as the content in the components is dynamically provided, client applications are provided with the flexibility to render the layout in the technology specific to the hosting environment (e.g., mobile device, web browser, virtual reality goggles, etc.) being utilized by a consumer. Such a configuration/capability provides a omni-channel delivery of content while maintaining editorial control for the business user.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

Figure 1:
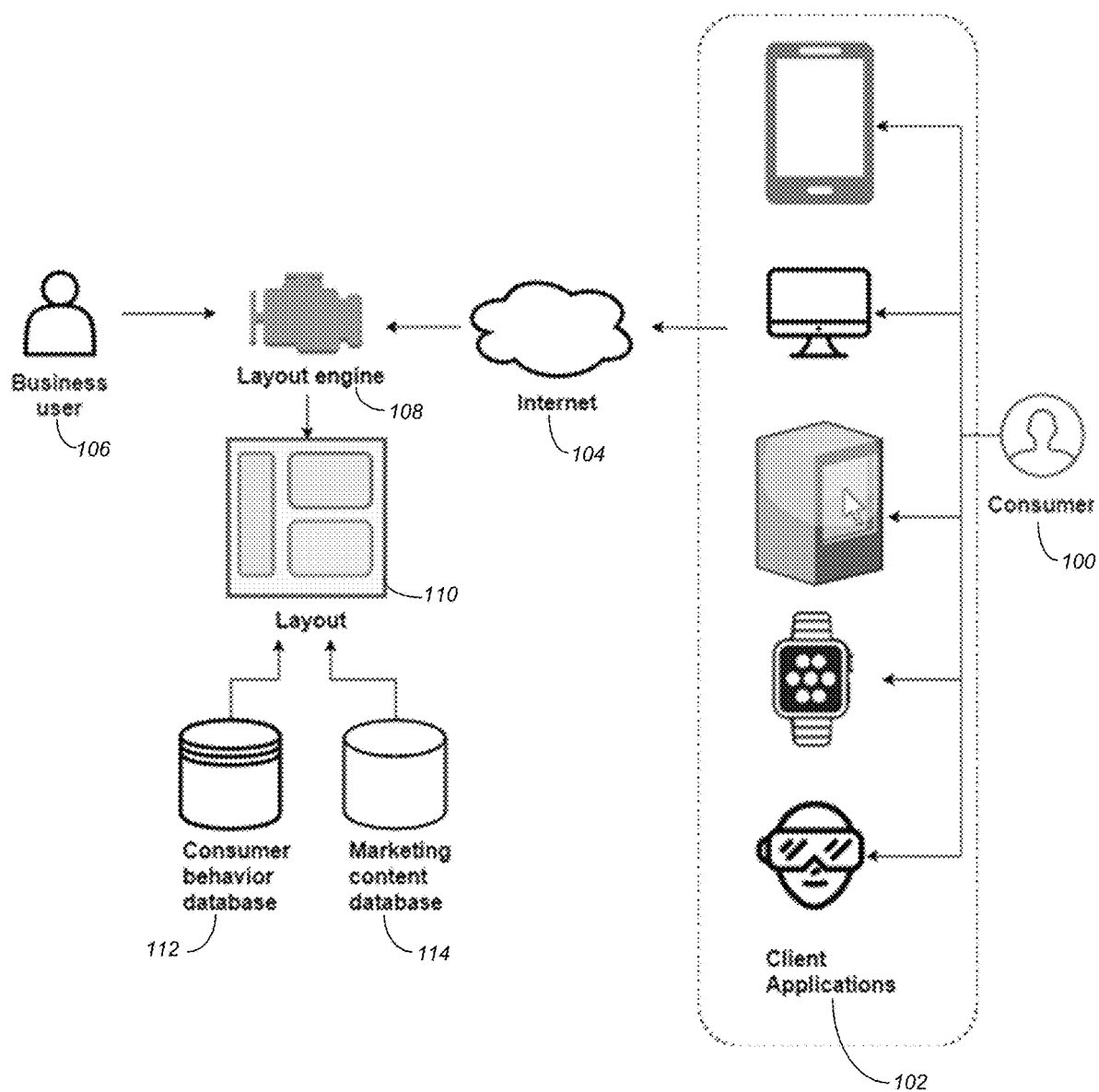
FIG. 1 is a system level view of the headless content management system architecture in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Definitions

The following provides definitions for one or more terms used to describe embodiments of the invention.

Component

An entity used by operators (business users) to assemble Layouts. Each Component has a name, a type, various meta-data, and associated marketing content. Components can inherit from other Components. Components are not responsible for the final representation to the consumer, they are rather structural entities that control what to render, not how to render.

Variance

A set of marketing content and meta-data associated with a Component. For example, a Component called "Promo" can have more than one Variance. One variance may be "Autumn Promo", and another variance may be "Summer Promo", each specifying unique marketing content and different meta-data. Variances enable personalization and multi-variate testing on the Component level.

Placeholder Component

A special component related to a given Component that doesn't have associated marketing content and is used for lazy-loading of a Layout by a Layout Engine.

Zones

Named areas on a given Layout. Zones expect Components to be placed by operators (business users) and may have restrictions as to what Components are expected to be placed there.

Layout

A composition of Zones and Components assembled by a Layout Engine based on a set of incoming parameters, personalization conditions and multi-variate testing. Layouts can also be built from Partial Layouts.

Partial Layout

A reusable fragment of a Layout that has one or many components. Partial Layouts are meant to be reused to compose Layouts.

Layout Engine

A program used by operators to compose Layouts from Components or Partial Layouts and by Client Applications to request content for Rendering to a Consumer. Therefore, Layout Engine works in two modes—layout authoring and layout delivery. A Graphical User Interface (GUI) is used for layout authoring by operators (business users) and non-GUI, Application programming interfaces (APIs) are used for layout delivery making it possible to consume the output of a Layout Engine by any technology. A Layout Engine is not responsible for Rendering of the layout in the final format, this is the responsibility of the Client Application.

Client Application

The program that the Consumer (end-user) is interacting with. This program issues requests to the Layout Engine via Application programming interfaces (APIs) and is responsible for the Rendering of the retrieved layout in the technology specific to the hosting environment where the program executes. For example, if the client application is a web application and the hosting environment is a web browser, then the technology may likely utilize HTML (hypertext markup language). Accordingly, the client application is responsible for utilizing any technology that produces HTML from the machine-readable output coming from the Layout Engine. For example, if the hosting environment is a wearable device, the technology could be the proprietary User Interface technology that is used for Rendering.

Visual Representation

Each Component can have one or many visual representations that specify how a Component is supposed to be Rendered. For example, a "Promo" component can have two or more visual representations that control look and feel for a component: "Featured Promotion" and "Teaser Promotion".

Rendering

The process of taking structured (machine-readable) Layout Engine output and representing it in a Graphical User Interface depending on the technology available within the hosting environment of a Client Application (HTML, Holograms, native device GUI library, etc.).

Marketing Content Database

A database that stores content that is associated with a component during layout composition and is used to store the composed layout.

Consumer Behavior Database

A database that stores all prior history of visitor interaction including behavior and profile information. This database is used for personalization on the Component level.

Personalization

The process of transforming the output of the Layout Engine per each request coming from a Client Application. This may include explicit and implicit parameters of each request.

Multi-Variate Testing

The process of finding the most optimal Variance for each Component.

Headless Content Management System Architecture

FIG. 1 is a system level view of the headless content management system architecture in accordance with one or more embodiments of the invention.

A consumer 100 may be consuming content via a variety of different client applications 102 (e.g., via virtual reality glasses, a digital watch (e.g., iWatch), a computer, a monitor, a mobile device, etc. In other words, a consumer/user 100 interacts with a client application 102 and is exposed to a variety of presentation mediums referred to as "screens". As used herein, such a screen can be viewed as any device and not necessarily a website. The data content delivered to the client application/screen 102 is delivered to the consumer 100 via Internet 104.

The issue becomes how to present the data content to the consumer 100 across the variety of client applications 102 while the business user 106 maintains control of the editorial and composition of the presentation/screen. Embodiments of the invention expose the business user 106 to a graphical user interface (GUI) that sits on top of a layout engine 108 that produces the layout 110. The layout 110 may be composed from a library of components with associated metadata and content that flows into the components. The operator of such a system is a business user, responsible for digital content production, putting together the semantic part of the content composition for a particular screen from newly created content components.

To enable the personalization of the layout 110 per consumer 100, the business user 106 may attach personalization conditions that are based on information in a consumer behavior database 112. Further, the business user 106 may desire to target different markets utilizing information in a marketing content database 114. In this regard, the business user 106 may create/utilize different variances for the different components in the layout 110 and such variances may be based on content/information from the consumer behavior database 112 and/or marketing content database 114.

Figure 2:
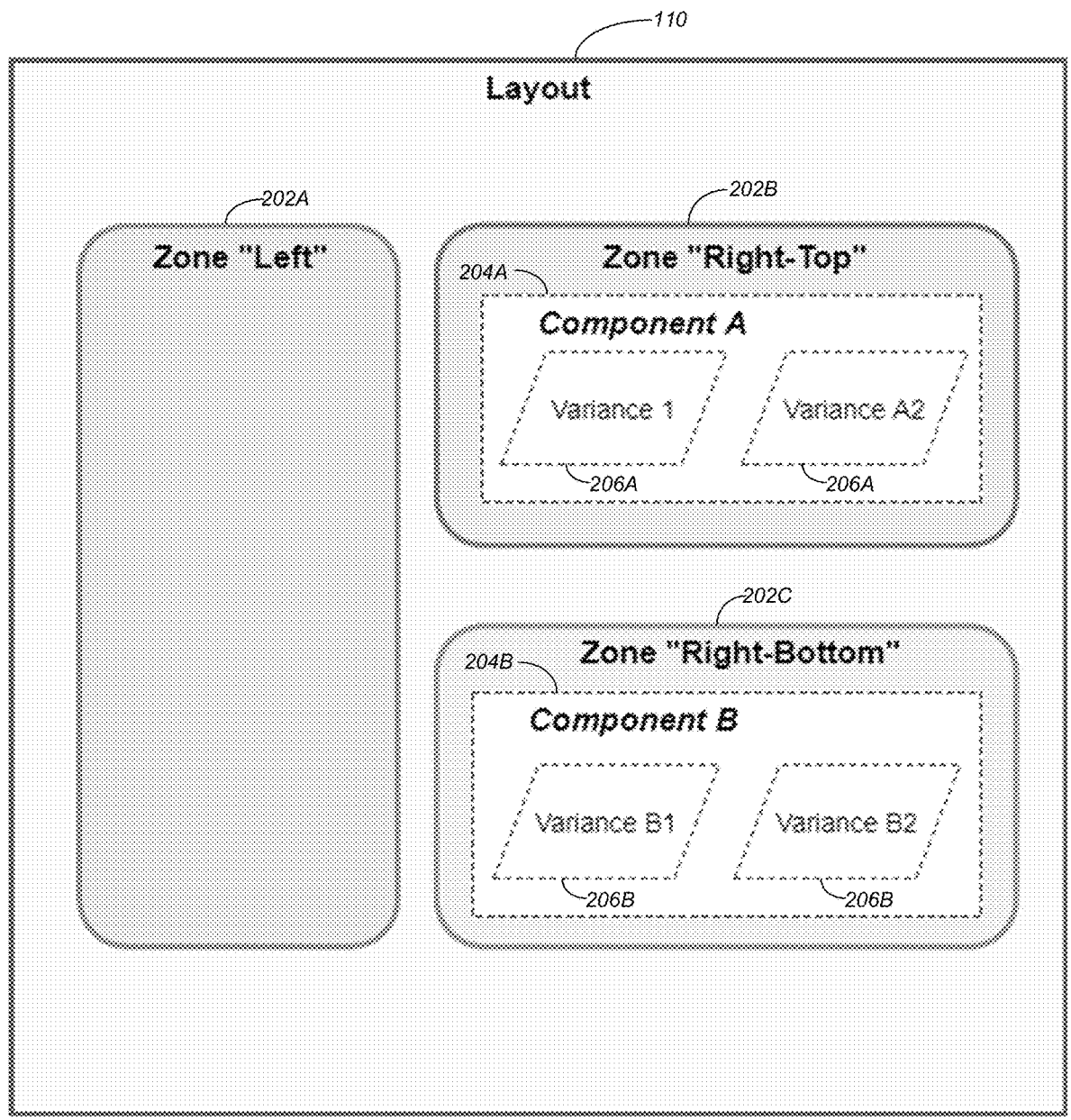
FIG. 2 illustrates the layout structure that a developer may provide in accordance with one or more embodiments of the invention.

FIG. 2 illustrates the layout structure that a developer may provide in accordance with one or more embodiments of the invention. U.S. Pat. No. 7,856,345, which is incorporated by reference herein describes various aspects of such a layout structure. A developer can define the structure of a layout 110 consisting of multiple zones 202A-202C (collectively referred to as zones 202). As described in the definition above, each zone 202 is a named area (i.e., Zone "Left", Zone "Right-Top", and Zone "Right-Bottom") of a layout 110. Zones 202 expect components 204A-204B (collectively referred to as components 204) to be placed by business users 106 and may have restrictions as to what components 204 are expected to be placed there. In other words, a defined zone 202 may include restrictions (established by a developer) regarding the components that are placed within a particular zone 202.

Components 204 define the structural entities that control what to render (and not how to render). In this regards, components 204 have names, types, metadata and associated marketing content. Each component 204 may have one or more variances 206A-206B. Such variances consist of sets of marketing content and metadata and enable personalization and multi-variate testing on the component level.

For example, a variance 206 may be utilized/displayed based on one or more specified conditions. For example, if a particular condition is true and another condition is false, Variance 1 may be displayed, while Variance 2 may be displayed for a different set of conditions. A rule editor may be utilized by a business user 106 to specify the different rules/conditions that are utilized to display a particular variance 206. In one or more embodiments of the invention, such a business user 106 may have access to select/utilize one or more rules from a library of rules (e.g., that is maintained in a local database and/or a cloud database) that consists of a pre-selected list of rules. Alternatively, the business user 106 may have access to different conditions that can be utilized when creating rules.

The architecture set forth in FIGS. 1 and 2 establish a foundation for managing content as well as delivering such content to consumers 100 via a variety of client applications 102. The description below sets forth the details of such management and delivery.

Content Management

One or more embodiments of the invention provide the ability for a business user 106 to manage the structure of the visual representation of content delivered via a client application 102 to a consumer 100. In this regard, a business user 106 controls the structure of a screen by interacting with zones 202 (also referred to as "placeholders") and composing the layout of components 204 within such zones 202. Accordingly, business users 106 can maintain control over how screens are composed. In contrast, in prior art traditional CMS and headless CMS systems, developers compose and control the screen.

More specifically, using a visual editing interface, operators (business users 106) compose a layout 110 from a set of components 204 and associate marketing content (e.g., from marketing content database 114) with the component 204. Components 204 are added to a named zone 202 on the layout 110 and each zone 202 may define a set of expected components 204 that can be added. This process ensures editorial control over the layout 110 composition as opposed to a code-controlled composition of components 204 that prevents operators (business users 106) from making any changes.

After the operator/business user 106 has finished composing a layout 110, it is saved in a database (e.g., a database of layouts 110). Since at the time of layout 110 composition, it is not known how the layout 110 is intended to be translated into the final visual representation (rendered) to the end user (consumer 100), the visual editing interface may utilize a structural representation of each component 204, providing the operator (business user 106) with the ability to focus on the semantics and content rather than look and feel. Accordingly, a business user 106 can make changes to the behavior of content (e.g., via a component 204/variance 206) without having to engage with a developer and without requiring a new release of a consumed visual representation/rendering. In other words, while a developer may define the general layout 110 and zones 202, the actual values and content that is rendered is controlled by the business user 106. In particular, while a developer may control the schema of a component 204 or object that is displayed, such as the volume, color, etc., the actual values and content displayed within such a schema is controlled by the business user 106.

Further to the above, business users 106 may opt to store a composed layout 110 as a named partial layout that can be reused to compose other layouts 110. Thus, a business user 106 has the option of building a partial screen/layout 110 that can be composed into larger layouts 110, and such a partial layout can be used in multiple areas.

As described above, business users 106 may elect to add any number of variances 206 for each component 204. Each variance 206 consists of one or more personalization rules that trigger an appropriate variance 206. The business users 106 may choose to add a variance 206 for a component 204 that is optimized for a target persona or audience, market, location or any other condition. Thus, a variance 206 controls the following multiple aspects of a component 204:

(1) the specific marketing content that is associated with the component 204;

(2) the concrete type of a component 204 as there may be more than one implementation of a component 204 for a given type (for example, a generic product detail component 204 may have two or more implementations). This controls how the component 204 is expected to be rendered by the client application 102; and (3) non-marketing meta-data associated with the component 204 (e.g., styling, configuration parameters, etc.).

As an example, one variance 206 may provide that promotional content has a particular image and messaging for Christmas, while different variances are directed to non-holiday promotional content. Accordingly, the headless CMS of embodiments of the invention enable a business user 106 to create a visual representation/rendering of content without the detailed technical knowledge that is required of a developer that is defining the structure of the layout 110. In this regard, a business user 106 can define a set of marketing content and meta-data (e.g., title, text, images and metadata that may describe the behavior of a displayed object) that is user editable, while a developer (e.g., a web developer) can still maintain control over the styling and layout 110.

Business users 106 may choose to start a multi-variate test on each component 204. Such multi-variate testing is used to find the most optimal variance 206 for each component 204. The multi-variate test activates the mechanism of measuring the effectiveness of a given variance 206 based on a predefined set of algorithms and strategies. After a period of time, a business user 106 reviews the effectiveness of variances 206 and selects the winning/optimal variance 206. Alternatively, embodiments of the invention may offer to select the winner/optimal variance 206 automatically (e.g., based on a predefined set of measurement criteria and comparing results of such measurement criteria across a range of variances 206). Embodiments of the invention are intended to include a variety of different methodologies for selecting/determining the winning/optimal variance 206 and is not limited to a specific embodiment described herein.

Further to the above, business users 106 may elect to vary a given layout 110 for a specific consumer language, region, or even a consuming client application 102. For example, if a target client application 102 is a wearable device (e.g., a watch), the constrained real estate of the final display may have an affect on which components 204 can be used on that layout 110 and specifics of the marketing content that can be associated with a component 204.

In view of the above, business users 106 are provided with the ability to change and grow digital content structures without developer involvement. Thus, embodiments of the invention provide for the headless authoring and management of digital content where the structural elements to be displayed are controlled by a developer and the content itself that is displayed (within the structural confines of the layout 110) is controlled by a business user 106 via a layout engine 108.

Content Delivery

As described above, the layout engine 108 receives a request from a client application 102 to deliver the content for rendering to a consumer 100 in a technology specific to a hosting environment where the client application 102 is executing. In addition, multiple different client applications execute in multiple different hosting environments. The description below provides details regarding the delivery of such content.

When a client application 102 requests a layout 110 by a given identifier (e.g., id, name or path), the layout engine 108 performs a lookup of the layout 110 saved in a layout database and performs an assembly of the components 204 placed in each named zone 202. The assembly results in machine readable output that can be interpreted by the client application 102 that performs the rendering of the layout 110 using the most appropriate client technology. For example, if a native mobile application is used, the technology may be specific to that mobile platform. Similarly, if a web browser is used, the technology may be a more standard markup technology such as HTML (hypertext markup language) or XML (extensible markup language).

Further, the client application 102 may request parts of a layout 110 by specifying the identifiers of the zones 202 or components 204 desired to be included into the response, and the rest of the layout 110 will be skipped from the response. This allows a client application 102 to selectively render parts of the layout 110 making the process more efficient as less data is travelling across the network, which is beneficial for mobile clients on slow networks If a client application 102 passes the identifier of the current visitor/consumer 100 and/or session, for example, via an HTTP (hypertext transfer protocol) header, a query string, a cookie, or any other means of client/server communication, the layout engine 108 may establish a special context where the layout 110 composition is executed. This context is established based on the information discovered in the consumer behavior database 112, such as the consumer identifier, any profile, and past behavior information. Depending on the personalization rules associated with each component 204, such context may affect the output of the layout engine 108 as different variances 206 may be activated. This process ensures the client application 102 can render personalized content and visual representation per individual consumer.

If a client application 102 does not explicitly pass any parameters (e.g., fails to identify the specific consumer 100) to the layout engine 108, the implicit attributes of the HTTP request are taken into account, such as IP address, language, etc. This information may be used to build a special context where the layout 110 composition is executed and affects the outcome of the personalization conditions. Therefore, it is not required for the consumer behavior database 112 to contain any information about the consumer 100 that is making the request. This process ensures the client application 102 can render personalized content and visual representation per individual consumer.

Further to the above, when a client application 102 makes a request for a given layout 110, each request along with the metadata associated with the layout 110 is recorded/stored in the consumer behavior database 112. Such recording/storage enables the collection of behavior data automatically (e.g., without additional user input/interaction) without extra effort. The collected information may be used to personalize subsequent requests to the layout engine 108.

The client applications 102 and layout engine 108 may also utilize various security protocols for communications (e.g., HTTPS [hypertext transfer protocol secure], SSL [secure sockets layer], various forms of encryption/authentication, etc.). If there is any security context established during a client application 102 request for a layout 110, the layout engine 108 may impersonate the request as a given identity (e.g., when retrieving the content/information needed to respond to the request) and return only the parts of the composed layout 110 that the identity has read access to. This guarantees that only authorized consumers can access given parts of a layout.

If a client application 102 specifies the content language to the layout engine 108, the requested layout 110 will either be composed based on (1) the availability of the marketing content (e.g., from the marketing content database 114) in that language, or (2) a layout 110 definition purposefully built for the given language, as the business users operating the Layout Engine GUI may chose to vary the composition of components per language.

Delivery of the content may also utilize a content delivery network (CDN) where content and/or services are distributed spatially relative to consumers 100 to provide high availability and performance. If a client application 102 or a CDN is enabled to persist the layout 110 locally, the layout 110 can be reused during subsequent requests and improve client application 102 rendering performance, as no additional round-trips to the layout engine 108 may be needed. While this significantly improves client application 102 performance, this may also disable the ability to deliver a personalized layout 110 for consumers 100. To address such a problem, the layout engine 108 may deliver the layout 110 with components 204 that are not personalized and replace the components 204 that are personalized with placeholder components 204. This allows the client application 102 to provide a greater user experience by loading most applications fast from a persisted layout 110 (retrieved either from local storage, the closest server, or from a CDN), and display a temporary visual for the personalized components 204 while progressively loading the actual content for personalized components 204 from the layout engine 108 asynchronously without affecting the client application 102 performance. This way, the client application 102 can achieve the benefits of fast rendering and personalization.

Logical Flow

Figure 3:
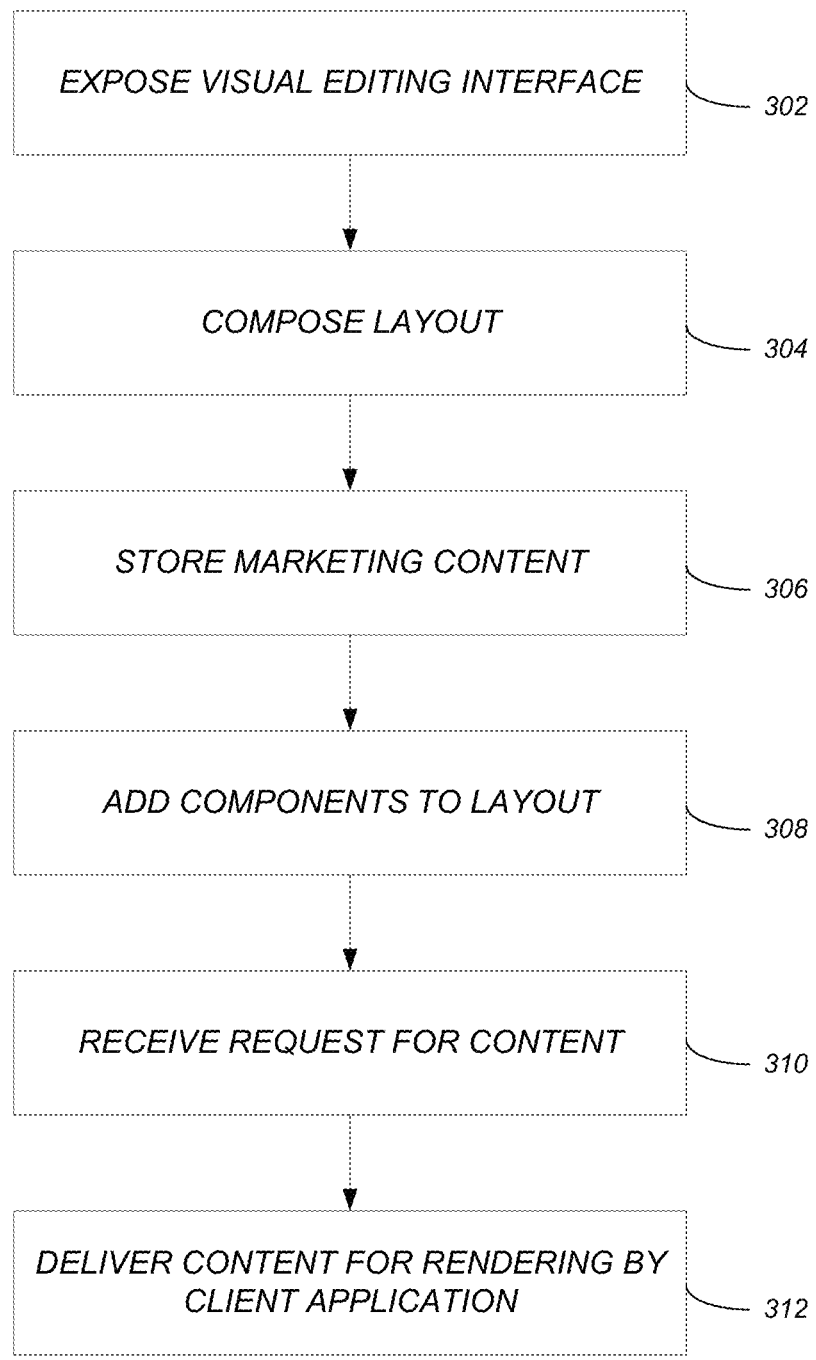
FIG. 3 illustrates the logical flow for generating digital content in accordance with one or more embodiments of the invention.

FIG. 3 illustrates the logical flow for generating digital content in accordance with one or more embodiments of the invention.

At step 302, a visual editing interface is exposed to a business user.

At step 304, input is accepted from the business user to compose a layout. The layout consists of one or more components, and marketing content is associated with the components. The layout may be stored in a layout database in its entirety or as a partial layout that can be reused to compose other layouts.

At step 306, the marketing content is stored in a marketing content database.

At step 308, each of the components is added, via the visual editing interface, to zones of the layout. Developer code restricts a type of component that can be added to the zones. Further, the components define structural entities that control what to render. In addition, the layout and the zones control a conceptual design for rendering the digital content. Variances can be added to each of the components. Each variance consists of one or more personalization rules that trigger different marketing content to be associated with a component. In this regard, the variances control the marketing content that is associated with each of the components, a type of each component, and non-marketing metadata associated with each component. An effectiveness of the variances may be measured based on a set of measurement criteria. Based on the set of measurement criteria, an optimal variance may be selected (to associate with one of the components).

As described above, business users 106 may vary a given layout based on/for a specific client application, a language, or a geographic region.

At step 310, a request for content is received from a client application. Multiple different client applications execute in multiple different hosting environments. In response to receiving the request, a lookup of the layout in a layout database may be performed. Thereafter, the components (added to the zones in the layout) are assembled and machine readable output is produced/generated that can be interpreted by the client application that performs the rendering of the layout in the technology specific to the hosting environment.

In one or more embodiments, the request may identify the consumer and in response, a special context based on information (relating to the consumer) in a consumer behavior database is established. The special context executes a composition of the layout that personalizes the components to the consumer based on the information in the consumer behavior database. Alternatively, the request may not specifically identify the consumer. In such an embodiment, in response to receiving the request, the special context is established based on implicit attribute information (in the request) in a consumer behavior database.

In one or more embodiments, upon receiving the request, the request and metadata are stored in a consumer behavior database that is then utilized to personalize responses to subsequent requests.

In one or more embodiments, a determination may be made that a security context has been established for the request. The request is then impersonated as a given identity (based on the security context), and only parts of the layout that the given identity has read access to are delivered.

Further to the above, components may include personalized components and non-personalized components. In one or more embodiments, the personalized components are replaced with placeholder components in the layout and the entire layout (i.e., with the non-personalized and placeholder components) is then delivered to the client application. The placeholder components are persisted (e.g., in a local database and/or a CDN) for expedited delivery to the client application (compared to delivery of the personalized components). The personalized components are then asynchronously delivered for progressive loading by the client application.

At step 312, in response to the request received from the client application, the content is delivered, in accordance with the layout, to the client application for rendering to a consumer in a technology specific to a hosting environment where the client application is executing.

Hardware Embodiments

Figure 4:
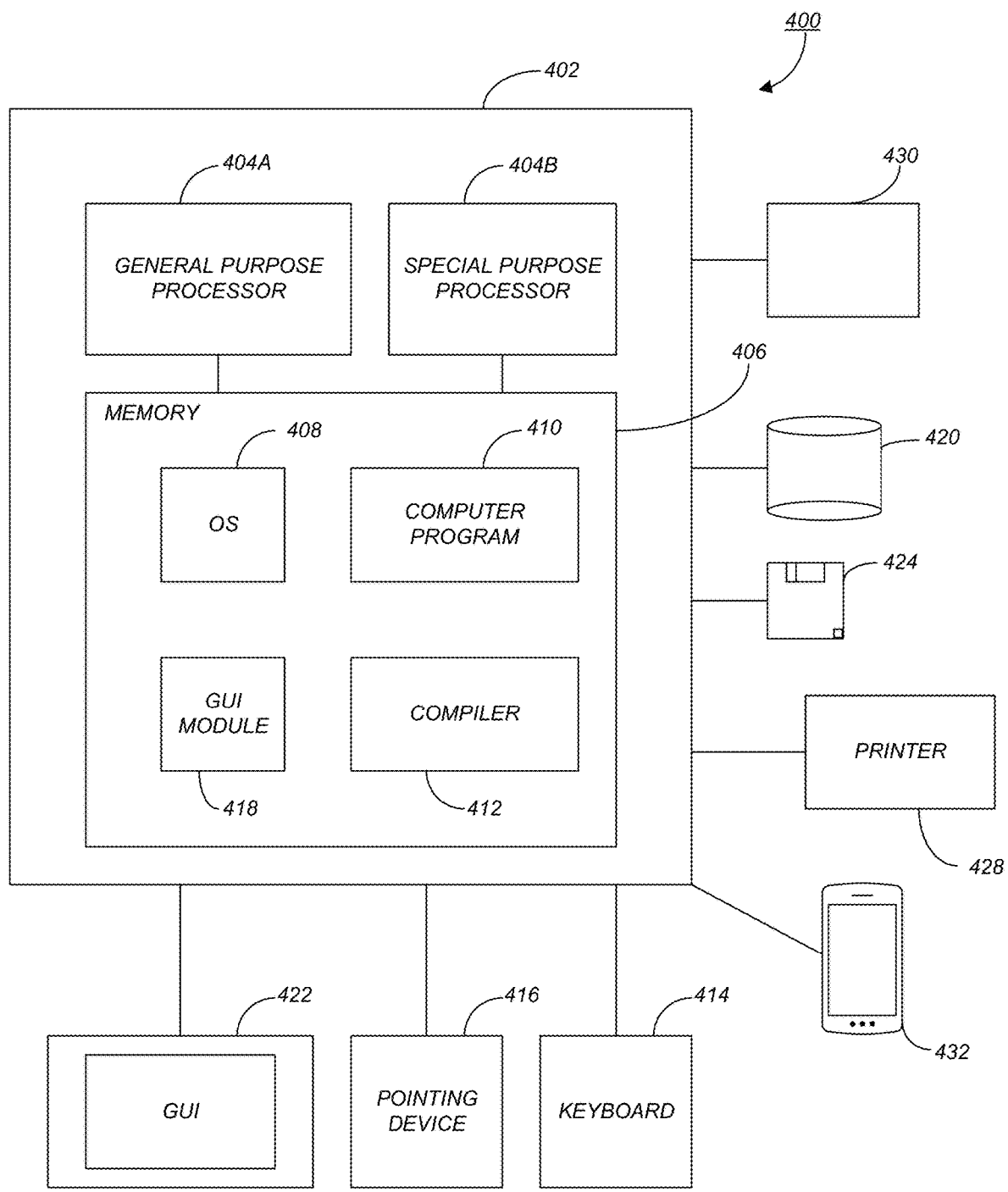
FIG. 4 is an exemplary hardware and software environment used to implement one or more embodiments of the invention.

FIG. 4 is an exemplary hardware and software environment 400 used to implement one or more embodiments of the invention. The hardware and software environment includes a computer 402 and may include peripherals. Computer 402 may be a user/client computer, server computer, or may be a database computer. The computer 402 comprises a general purpose hardware processor 404A and/or a special purpose hardware processor 404B (hereinafter alternatively collectively referred to as processor 404) and a memory 406, such as random access memory (RAM). The computer 402 may be coupled to, and/or integrated with, other devices, including input/output (I/O) devices such as a keyboard 414, a cursor control device 416 (e.g., a mouse, a pointing device, pen and tablet, touch screen, multi-touch device, etc.) and a printer 428. In one or more embodiments, computer 402 may be coupled to, or may comprise, a portable or media viewing/listening device 432 (e.g., an MP3 player, IPOD, NOOK, portable digital video player, cellular device, personal digital assistant, etc.). In yet another embodiment, the computer 402 may comprise a multi-touch device, mobile phone, gaming system, internet enabled television, television set top box, or other internet enabled device executing on various platforms and operating systems.

In one embodiment, the computer 402 operates by the general purpose processor 404A performing instructions defined by the computer program 410 under control of an operating system 408. The computer program 410 and/or the operating system 408 may be stored in the memory 406 and may interface with the user and/or other devices to accept input and commands and, based on such input and commands and the instructions defined by the computer program 410 and operating system 408, to provide output and results.

Output/results may be presented on the display 422 or provided to another device for presentation or further processing or action. In one embodiment, the display 422 comprises a liquid crystal display (LCD) having a plurality of separately addressable liquid crystals. Alternatively, the display 422 may comprise a light emitting diode (LED) display having clusters of red, green and blue diodes driven together to form full-color pixels. Each liquid crystal or pixel of the display 422 changes to an opaque or translucent state to form a part of the image on the display in response to the data or information generated by the processor 404 from the application of the instructions of the computer program 410 and/or operating system 408 to the input and commands. The image may be provided through a graphical user interface (GUI) module 418. Although the GUI module 418 is depicted as a separate module, the instructions performing the GUI functions can be resident or distributed in the operating system 408, the computer program 410, or implemented with special purpose memory and processors.

In one or more embodiments, the display 422 is integrated with/into the computer 402 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD), portable/handheld game/music/video player/console devices (e.g., IPOD TOUCH, MP3 players, NINTENDO 3DS, PLAYSTATION PORTABLE, etc.), touch tables, and walls (e.g., where an image is projected through acrylic and/or glass, and the image is then backlit with LEDs).

Some or all of the operations performed by the computer 402 according to the computer program 410 instructions may be implemented in a special purpose processor 404B. In this embodiment, some or all of the computer program 410 instructions may be implemented via firmware instructions stored in a read only memory (ROM), a programmable read only memory (PROM) or flash memory within the special purpose processor 404B or in memory 406. The special purpose processor 404B may also be hardwired through circuit design to perform some or all of the operations to implement the present invention. Further, the special purpose processor 404B may be a hybrid processor, which includes dedicated circuitry for performing a subset of functions, and other circuits for performing more general functions such as responding to computer program 410 instructions. In one embodiment, the special purpose processor 404B is an application specific integrated circuit (ASIC).

The computer 402 may also implement a compiler 412 that allows an application or computer program 410 written in a programming language such as C, C++, Assembly, SQL, PYTHON, PROLOG, MATLAB, RUBY, RAILS, HASKELL, or other language to be translated into processor 404 readable code. Alternatively, the compiler 412 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 410 accesses and manipulates data accepted from I/O devices and stored in the memory 406 of the computer 402 using the relationships and logic that were generated using the compiler 412.

The computer 402 also optionally comprises an external communication device such as a modem, satellite link, Ethernet card, or other device for accepting input from, and providing output to, other computers 402.

In one embodiment, instructions implementing the operating system 408, the computer program 410, and the compiler 412 are tangibly embodied in a non-transitory computer-readable medium, e.g., data storage device 420, which could include one or more fixed or removable data storage devices, such as a zip drive, floppy disc drive 424, hard drive, CD-ROM drive, tape drive, etc. Further, the operating system 408 and the computer program 410 are comprised of computer program 410 instructions which, when accessed, read and executed by the computer 402, cause the computer 402 to perform the steps necessary to implement and/or use the present invention or to load the program of instructions into a memory 406, thus creating a special purpose data structure causing the computer 402 to operate as a specially programmed computer executing the method steps described herein. Computer program 410 and/or operating instructions may also be tangibly embodied in memory 406 and/or data communications devices 430, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 402.

Figure 5:
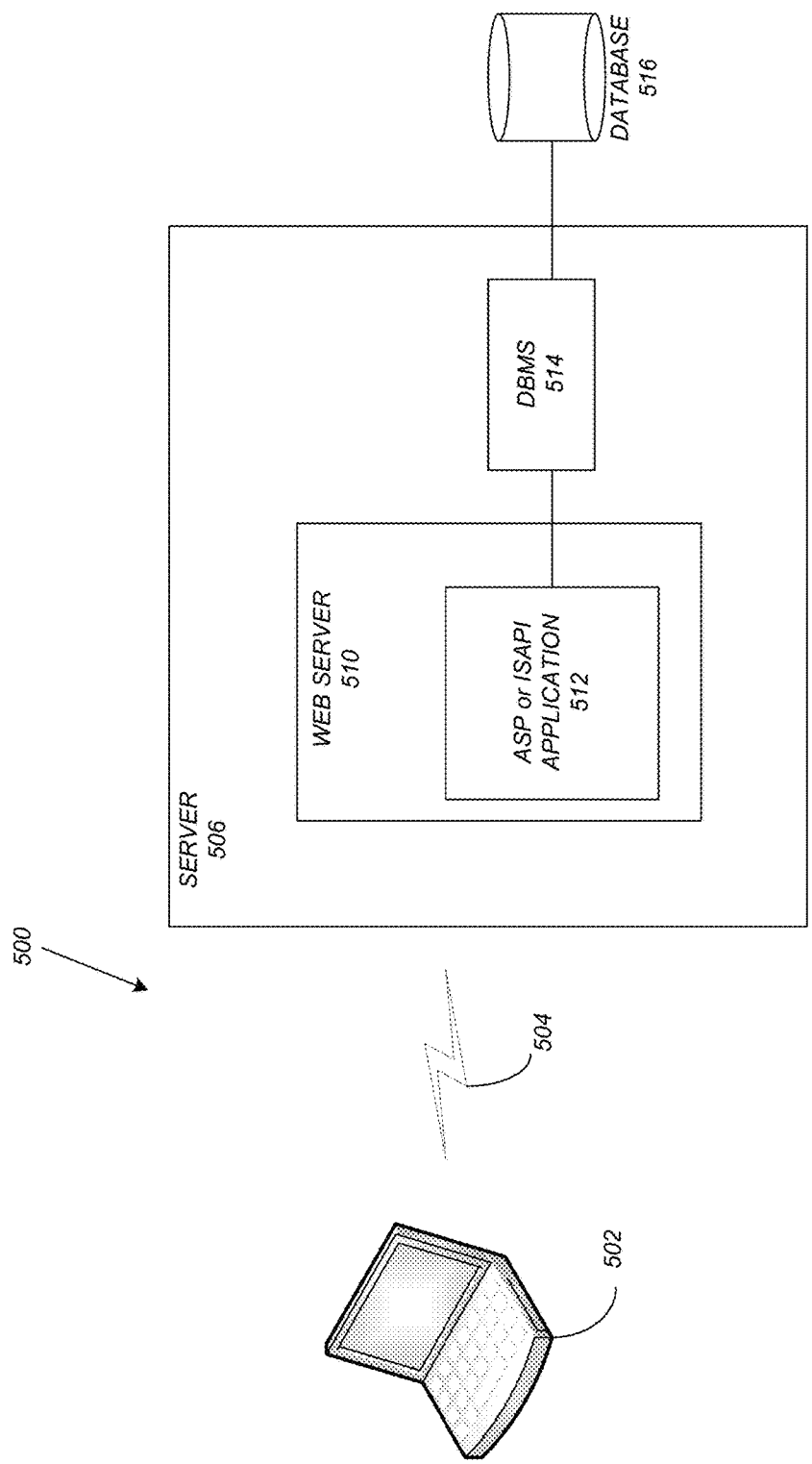
FIG. 5 schematically illustrates a typical distributed/cloud-based computer system using a network to connect client computers to server computers in accordance with one or more embodiments of the invention.

FIG. 5 schematically illustrates a typical distributed/cloud-based computer system 500 using a network 504 to connect client computers 502 to server computers 506. A typical combination of resources may include a network 504 comprising the Internet, LANs (local area networks), WANs (wide area networks), SNA (systems network architecture) networks, or the like, clients 502 that are personal computers or workstations (as set forth in FIG. 4), and servers 506 that are personal computers, workstations, minicomputers, or mainframes (as set forth in FIG. 4). However, it may be noted that different networks such as a cellular network (e.g., GSM [global system for mobile communications] or otherwise), a satellite based network, or any other type of network may be used to connect clients 502 and servers 506 in accordance with embodiments of the invention.

A network 504 such as the Internet connects clients 502 to server computers 506. Network 504 may utilize ethernet, coaxial cable, wireless communications, radio frequency (RF), etc. to connect and provide the communication between clients 502 and servers 506. Further, in a cloud-based computing system, resources (e.g., storage, processors, applications, memory, infrastructure, etc.) in clients 502 and server computers 506 may be shared by clients 502, server computers 506, and users across one or more networks. Resources may be shared by multiple users and can be dynamically reallocated per demand. In this regard, cloud computing may be referred to as a model for enabling access to a shared pool of configurable computing resources.

Clients 502 may execute a client application or web browser and communicate with server computers 506 executing web servers 510. Such a web browser is typically a program such as MICROSOFT INTERNET EXPLORER, MOZILLA FIREFOX, OPERA, APPLE SAFARI, GOOGLE CHROME, etc. Further, the software executing on clients 502 may be downloaded from server computer 506 to client computers 502 and installed as a plug-in or ACTIVEX control of a web browser. Accordingly, clients 502 may utilize ACTIVEX components/component object model (COM) or distributed COM (DCOM) components to provide a user interface on a display of client 502. The web server 510 is typically a program such as MICROSOFT'S INTERNET INFORMATION SERVER.

Web server 510 may host an Active Server Page (ASP) or Internet Server Application Programming Interface (ISAPI) application 512, which may be executing scripts. The scripts invoke objects that execute business logic (referred to as business objects). The business objects then manipulate data in database 516 through a database management system (DBMS) 514. Alternatively, database 516 may be part of, or connected directly to, client 502 instead of communicating/obtaining the information from database 516 across network 504. When a developer encapsulates the business functionality into objects, the system may be referred to as a component object model (COM) system. Accordingly, the scripts executing on web server 510 (and/or application 512) invoke COM objects that implement the business logic. Further, server 506 may utilize MICROSOFT'S TRANSACTION SERVER (MTS) to access required data stored in database 516 via an interface such as ADO (Active Data Objects), OLE DB (Object Linking and Embedding DataBase), or ODBC (Open DataBase Connectivity).

Generally, these components 500-516 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 502 and 506 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 502 and 506. Thus, embodiments of the invention are implemented as a software application on a client 502 or server computer 506. Further, as described above, the client 502 or server computer 506 may comprise a thin client device or a portable device that has a multi-touch-based display.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, content delivery network (CDN), or stand-alone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented system for generating digital content comprising:
   (a) a computer;
   (b) developer code executing on the computer, wherein:
      (1) the developer code defines one or more zones, the more zones define a structure of a layout, and the developer code restricts a type of component that can be added to one or more of the one or more zones;
      (2) the developer code controls a schema of one or more components;
      (3) the developer code controls structural elements to be displayed while permitting content that is displayed to be controlled by a layout engine;
   (c) the layout engine executing on the computer, wherein:
      (1) the layout engine exposes a visual editing interface to a business user;
      (2) the visual editing interface accepts input from the business user to compose the layout comprising one or more components without engaging with a developer that controls the developer code;
      (3) marketing content is associated with one or more of the one or more components;
      (4) the marketing content is stored in a marketing content database;
      (5) each of the one or more components are added, via the visual editing interface, to one or more zones of the layout consistent with the type of component set forth in the developer code;
      (7) the one or more components define structural entities that control what marketing content to render;
      (8) the layout and the one or more zones control a conceptual design for rendering the marketing content;
      (9) the layout engine receives a request, from a client application;
      (10) multiple different client applications execute in multiple different hosting environments; and
      (11) in response to the request received from the client application, the layout engine delivers the component and associated marketing content, in accordance with the layout, to the client application for rendering to a consumer in a technology specific to a hosting environment where the client application is executing.

2. The computer-implemented system of claim 1, further comprising:
   a layout database where the layout is stored, wherein the layout is stored in the layout database as a partial layout, and wherein the partial layout can be reused to compose other layouts.

3. The computer-implemented system of claim 1, further comprising:
   one or more variances that are added, by the business user, to each of the one or more components, wherein each of the one or more variances comprises one or more personalization rules that trigger different marketing content to be associated with the one or more components.

4. The computer-implemented system of claim 3, wherein the one or more variances control:
   the marketing content that is associated with each of the one or more components;
   a type of each of the one or more components; and
   non-marketing metadata associated with each of the one or more components.

5. The computer-implemented system of claim 3, wherein the layout engine:
   measures an effectiveness of the one or more variances based on a set of measurement criteria; and
   selects, based on the set of measurement criteria, an optimal variance from the one or more variances, to associate with one of the one or more components.

6. The computer-implemented system of claim 1, wherein the layout is varied, based on input from the business user, and based on the client application, a language, or a geographic region.

7. The computer-implemented system of claim 1, wherein in response to the layout engine receiving the request, the layout engine:
  performs a lookup of the layout in a layout database;
  assembles the one or more components added to the one or more zones in the layout; and
  produces machine readable output that can be interpreted by the client application that performs the rendering of the layout in the technology specific to the hosting environment where the client application is executing.

8. The computer-implemented system of claim 1, wherein:
  the request identifies the consumer;
  in response to receiving the request, the layout engine establishes a special context based on information in a consumer behavior database, wherein the information relates to the consumer; and
  the special context executes a composition of the layout that personalizes the one or more components to the consumer based on the information in the consumer behavior database.

9. The computer-implemented system of claim 1, wherein:
  the request does not specifically identify the consumer;
  in response to receiving the request, the layout engine establishes a special context based on information in a consumer behavior database, wherein the information relates to implicit attributes in the request; and
  the special context executes a composition of the layout that personalizes the one or more components to the consumer based on the information in the consumer behavior database.

10. The computer-implemented system of claim 1, wherein:
  upon receiving the request, the layout engine records the request and metadata in a consumer behavior database; and
  the layout engine uses the consumer behavior database to personalize responses to subsequent requests.

11. The computer-implemented system of claim 1, wherein the layout engine:
  determines that a security context has been established for the request;
  impersonates the request as a given identity based on the security context; and
  delivers only parts of the layout that the given identity has read access to.

12. The computer-implemented system of claim 1, wherein:
  the one or more components comprise personalized components and non-personalized components;
  the layout engine replaces the personalized components with placeholder components in the layout;
  the layout engine delivers, to the client application, the layout with the non-personalized components and the placeholder components;
  the placeholder components are persisted for expedited delivery to the client application compared to delivery of the personalized components; and
  the layout engine delivers the personalized components asynchronously for progressive loading by the client application.

13. A computer-implemented method for generating digital content, comprising:
  (a) developer code defining one or more zones, wherein:
    (1) the one or more zones define a structure of a layout;
    (2) the developer code restricts a type of component that can be added to one or more of the one or more zones;
    (3) the developer code controls a schema of one or more components;
    (4) the developer code controls structural elements to be displayed while permitting content that is displayed to be controlled by a layout engine;
  (b) exposing a visual editing interface to a business user;
  (c) accepting input from the business user to compose a layout comprising one or more components without engaging with a developer that controls the developer code, wherein marketing content is associated with one or more of the one or more components;
  (d) storing the marketing content in a marketing content database;
  (e) adding each of the one or more components, via the visual editing interface, to one or more zones of the layout consistent with the type of component set forth in the developer code, wherein:
    (1) the one or more components define structural entities that control what marketing content to render;
    (5) the layout and the one or more zones control a conceptual design for rendering the marketing content;
  (f) receiving a request, from a client application, wherein multiple different client applications execute in multiple different hosting environments; and
  (g) in response to the request received from the client application, delivering the component and the associated marketing content, in accordance with the layout, to the client application for rendering to a consumer in a technology specific to a hosting environment where the client application is executing.

14. The computer-implemented method of claim 13, further comprising:
  storing the layout in a layout database, wherein the layout is stored in the layout database as a partial layout;
  reusing the partial layout to compose other layouts.

15. The computer-implemented method of claim 13, further comprising:
  adding one or more variances, to each of the one or more components, wherein each of the one or more variances comprises one or more personalization rules that trigger different marketing content to be associated with the one or more components.

16. The computer-implemented method of claim 15, wherein the one or more variances control:
  the marketing content that is associated with each of the one or more components;
  a type of each of the one or more components; and
  non-marketing metadata associated with each of the one or more components.

17. The computer-implemented method of claim 15, further comprising:
  measuring an effectiveness of the one or more variances based on a set of measurement criteria; and
  selecting, based on the set of measurement criteria, an optimal variance from the one or more variances, to associate with one of the one or more components.

18. The computer-implemented method of claim 13, wherein the layout is varied, based on input from the business user, and based on the client application, a language, or a geographic region.

19. The computer-implemented method of claim 13, wherein in response to receiving the request:
  performing a lookup of the layout in a layout database;

assembling the one or more components added to the one or more zones in the layout; and producing machine readable output that can be interpreted by the client application that performs the rendering of the layout in the technology specific to the hosting environment where the client application is executing.

20. The computer-implemented method of claim 13, wherein:

the request identifies the consumer;

in response to receiving the request, establishing a special context based on information in a consumer behavior database, wherein the information relates to the consumer; and the special context executes a composition of the layout that personalizes the one or more components to the consumer based on the information in the consumer behavior database.

21. The computer-implemented method of claim 13, wherein:

the request does not specifically identify the consumer;

in response to receiving the request, establishing a special context based on information in a consumer behavior database, wherein the information relates to implicit attributes in the request; and the special context executes a composition of the layout that personalizes the one or more components to the consumer based on the information in the consumer behavior database.

22. The computer-implemented method of claim 13, further comprising:

upon receiving the request, recording the request and metadata in a consumer behavior database; and utilizing the consumer behavior database to personalize responses to subsequent requests.

23. The computer-implemented method of claim 13, further comprising:

determining that a security context has been established for the request;

impersonating the request as a given identity based on the security context; and delivering only parts of the layout that the given identity has read access to.

24. The computer-implemented method of claim 13, wherein:

the one or more components comprise personalized components and non-personalized components;

the method further comprises:

replacing the personalized components with placeholder components in the layout;

delivering, to the client application, the layout with the non-personalized components and the placeholder components;

persisting the placeholder components for expedited delivery to the client application compared to delivery of the personalized components; and delivering the personalized components asynchronously for progressive loading by the client application.

* * * * *